United States Patent [19]

Reiland

[11] Patent Number: 4,965,706

[45] Date of Patent: Oct. 23, 1990

[54] HEADLAMP ADJUSTING MECHANISM

[76] Inventor: Bernard F. Reiland, 15 Crestwood La., Rockford, Ill. 61107

[21] Appl. No.: 380,501

[22] Filed: Jul. 17, 1989

[51] Int. Cl.5 .............................................. B60Q 1/06
[52] U.S. Cl. ..................................... 362/66; 362/773; 362/428
[58] Field of Search ................. 362/66, 270, 273, 287, 362/289, 428

[56] References Cited

U.S. PATENT DOCUMENTS

| 4,196,459 | 4/1980 | Dick | 362/66 |
|---|---|---|---|
| 4,333,131 | 6/1982 | Hujimoto et al. | 363/372 |
| 4,412,274 | 10/1983 | McMahan et al. | 362/269 |
| 4,412,275 | 10/1983 | McMahan | 362/269 |
| 4,674,018 | 6/1987 | Ryder et al. | 362/424 |
| 4,688,725 | 8/1987 | Saijo et al. | 362/66 |
| 4,707,769 | 11/1987 | Van Duyn | 362/66 |
| 4,709,306 | 11/1987 | Harris et al. | 362/66 |
| 4,761,717 | 8/1988 | McMahan et al. | 362/66 |
| 4,843,523 | 6/1989 | Nakamura | 362/273 |
| 4,845,598 | 7/1989 | Watanabe | 362/66 |

Primary Examiner—Ira S. Lazarus
Assistant Examiner—Richard R. Cole
Attorney, Agent, or Firm—Leydig, Voit & Mayer

[57] ABSTRACT

A mechanism for adjusting either the vertical or side-to-side tilt of a vehicle headlamp assembly of the type having two replaceable bulbs in a single housing. The adjusting mechanism comprises a housing, a horizontally movable cam mounted in the housing and operable to adjust the headlamp when shifted linearly back and forth, and a vertically movable cam adapted to be actuated by a screw and operable to shift the horizontally movable cam back and forth.

10 Claims, 3 Drawing Sheets

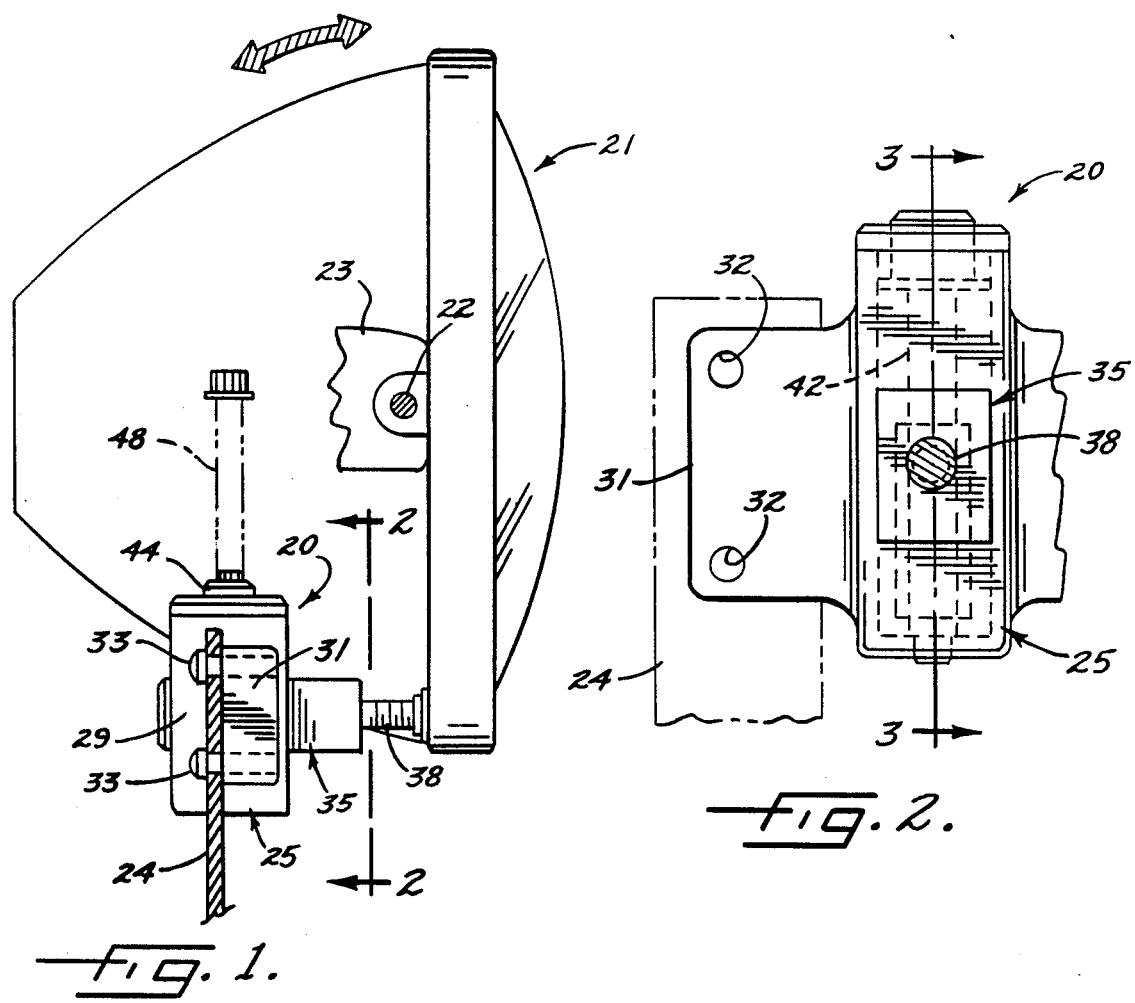
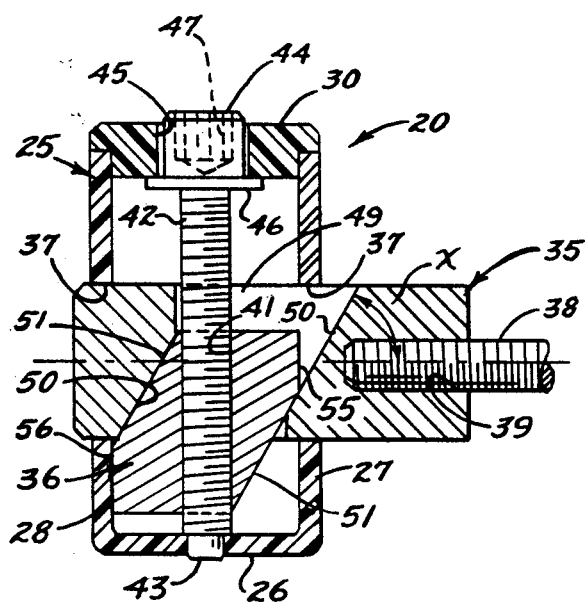
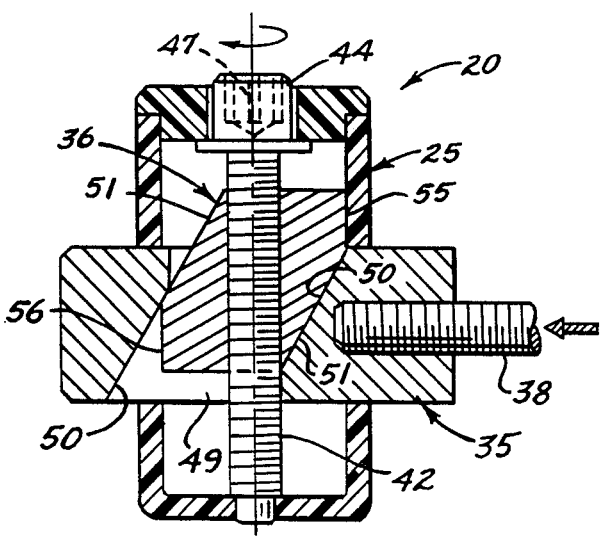

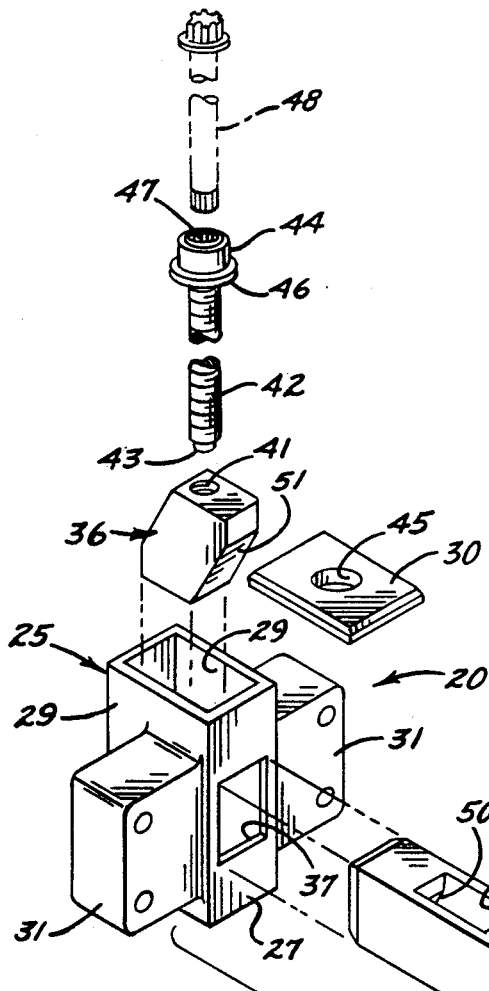
_fig. 5._
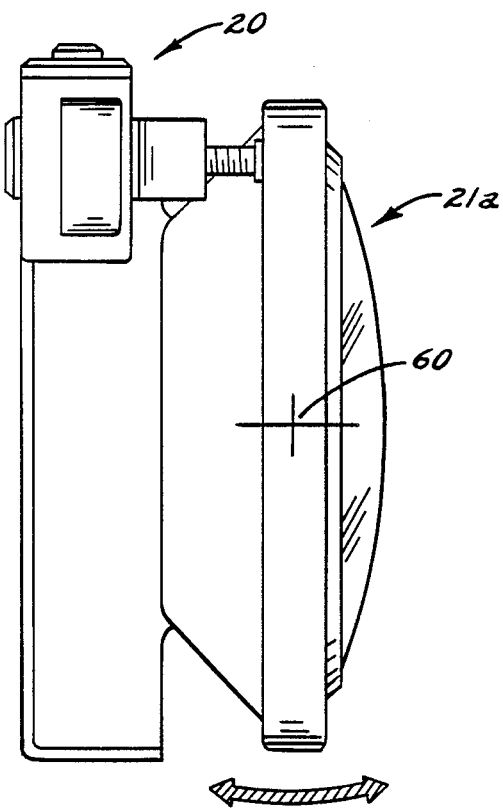
_fig. 6._
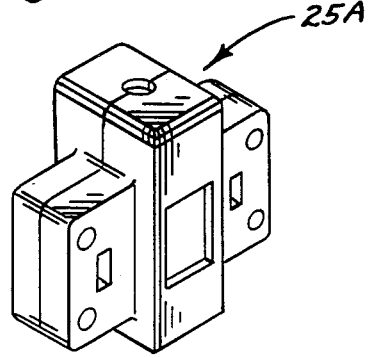
_fig. 7._

HEADLAMP ADJUSTING MECHANISM

BACKGROUND OF THE INVENTION

This invention relates generally to a mechanism for adjusting a vehicle headlamp.

Ryder et al U.S. Pat. No. 4,674,018 discloses a headlamp adjusting mechanism for a modern headlamp assembly of the type in which both the high and low beam bulbs are contained in a common housing adapted to be adjusted interiorly from the vehicle engine compartment.

The Ryder et al adjusting mechanism relies on gears rotatably mounted in a housing, requires a comparatively large number of parts and is relatively expensive. Specifically, the Ryder et al adjusting mechanism includes a plastic housing in which a pair of bevel gears are mounted, one gear being connected to a screw coupled to the headlamp assembly while the other gear is associated with an adjusting screw. When the coupled gears are rotated, stress flexes the housing and causes the screws to bind in the housing so as to impair the adjusting function. Moreover, the seams and parting lines in the housing tend to open up from the forces of the gears working together and this allows moisture and grime to enter the housing and foul the mechanism.

SUMMARY OF THE INVENTION

The general aim of the present invention is to provide a new and improved headlamp adjusting mechanism which, when compared with prior mechanisms of the same general type, is simpler, less expensive and more durable and trouble-free.

A more detailed object of the invention is to achieve the foregoing through the provision of a headlight adjusting mechanism in which the adjustment is effected through the coaction of two linearly movable cams which apply only nominal stress to the housing.

The invention also resides in the unique arrangement of the cams to enable the adjusting mechanism to be constructed as a relatively compact unit while possessing a comparatively wide range of adjustment.

These and other objects and advantages of the invention will become more apparent from the following detailed description when taken in conjunction with the accompanying drawings.

BRIEF DESCRIPTION OF THE DRAWINGS

FIG. 1 is a side elevational view of a typical automotive headlamp assembly equipped with one embodiment of a new and improved adjusting mechanism incorporating the unique features of the present invention.

FIG. 2 is a front elevational view of the adjusting mechanism as taken along the line 2—2 of FIG. 1.

FIG. 3 is a fragmentary cross-section taken substantially along the line 3—3 of FIG. 2.

FIG. 4 is a view similar to FIG. 3 but shows certain components of the adjusting mechanism in moved positions.

FIG. 5 is an exploded perspective view of the adjusting mechanism.

FIG. 6 is a top plan view showing an adjusting mechanism positioned to adjust a headlamp assembly in a different plane.

FIG. 7 is a perspective view of a modified housing for the adjusting mechanism.

DETAILED DESCRIPTION OF THE PREFERRED EMBODIMENTS

Figure 8:
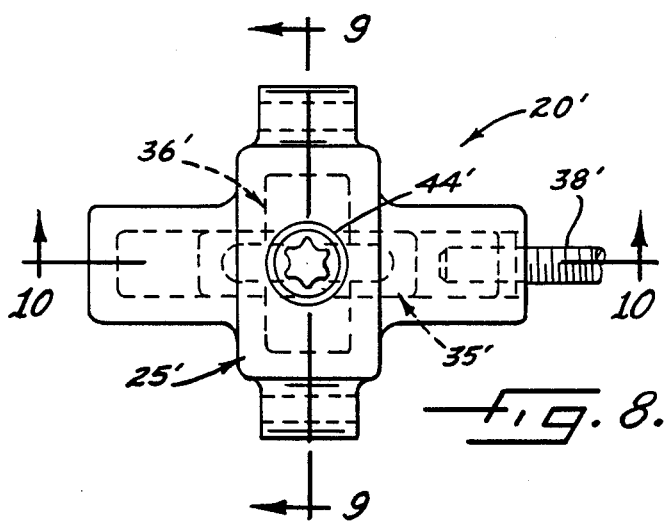
FIG. 8 is a top plan view of another embodiment of an adjusting mechanism incorporating the features of the invention.

For purposes of illustration, the invention has been shown in the drawings as being embodied in a mechanism 20 for adjusting a vehicle headlamp assembly 21 in order to aline the headlamp assembly properly with respect to the vehicle. The headlamp assembly is of typical modern construction in which high and low beam replaceable bulbs are contained in a single housing adapted to be adjusted from the interior of the engine compartment.

The headlamp assembly 21 itself may be mounted in various ways and, for purposes of simplicity, the assembly has been illustrated only diagrammatically in FIG. 1. Thus, the assembly has been shown as being supported to swing upwardly and downwardly about a generally horizontal pivot 22 on a fixed frame part 23 of the vehicle. Another fixed frame part 24 is located behind the headlamp assembly and supports the adjusting mechanism 20. The latter normally holds the headlamp assembly in a fixed position about the pivot 22 but may be adjusted to change the vertical tilt of the assembly.

In the embodiment of the invention shown in FIGS. 1 to 6, the invention comprises a single piece housing 25 molded of suitable plastic and defined by a bottom wall 26 (FIG. 3), front and rear walls 27 and 28, and opposing side walls 29 (FIG. 5). The housing is hollow, is rectangular in cross-section and is adapted to be closed at its top by a plastic cap 30 which may be bonded to the housing. Wings 31 are molded integrally with and project laterally from the side walls 29 of the housing and are formed with holes 32 (FIG. 2) which are adapted to receive fasteners 33 (FIG. 1) for securing the housing to the frame part 24.

In accordance with the invention, two linearly movable cams 35 and 36 (FIG. 3) are mounted in the housing 25 and are adapted to coact with one another to effect adjustment of the headlamp assembly 21. The cam 35 is defined by a horizontal block which is guided for back and forth sliding by openings 37 formed in the front and rear walls 27 and 28 of the housing. Connected to the cam is a horizontal link 38 which also is connected to the headlamp assembly 21. In this particular instance, the link 38 is a threaded rod whose outer end portion is screwed tightly into a horizontal threaded bore 39 formed in the cam 35 and opening out of the front thereof. At its forward end, the rod 38 carries a head 40 (FIG. 5) which is connected to the headlamp assembly and which enables the assembly to move relative to the rod when the assembly is swung about the pivot 22. The headlamp assembly is tilted upwardly when the cam 35 and the rod 38 are moved forwardly and is tilted downwardly when the cam 35 and the rod 38 are moved rearwardly.

Back and forth movement of the cam 35 is produced in response to up and down movement of the cam 36 which, in the embodiment of FIGS. 1 to 7, also is in the form of a block. The cam 36 is formed with a vertically extending threaded bore 41 which receives an upright adjusting screw 42 with an interference fit to insure against turning of the screw except when the screw is positively adjusted. A reduced-diameter dogpoint 43 on the lower end of the screw is rotatably received by the bottom wall 26 of the housing 25 while a head 44 on the upper end of the screw is received in an opening 45 in the cap 30. Immediately beneath the head is a flange 46 which engages the lower side of the cap to captivate the adjusting screw against upward movement. Accordingly, the screw is fixed axially and thus the cam 36 is shifted upwardly when the screw is turned in one direction and downwardly when the screw is turned in the opposite direction. Herein, the head of the screw is formed with a socket 47 which is adapted to receive a driving tool 48 for turning the screw. An extension 48 (FIGS. 1 and 5) may be attached to the screw if necessary to provide additional height.

Pursuant to the invention, the cams 35 and 36 are formed with coacting cam surfaces which force the cam 35 rearwardly and forwardly when the cam 36 is shifted upwardly and downwardly, respectively, by the screw 42. In the embodiment of FIGS. 1 to 7, the cam 36 fits in a vertically extending opening 49 formed through the cam 35, the front and rear sides 50 of such opening defining the cam surfaces of the cam 35. As shown in FIG. 3, the sides 50 of the opening 49 are disposed in parallel planes which slope forwardly upon progressing upwardly. In this instance, each of the sides 50 is inclined at an acute included angle X of between 45 and 60 degrees relative to the longitudinal centerline of the cam 35.

The cam surfaces of the cam 36 are defined by the front and rear sides 51 thereof. Such sides extend parallel to and are disposed in face-to-face engagement with the cam surfaces 50 defined within the opening 49 of the cam 35.

With the foregoing arrangement, turning of the screw 42 in one direction causes the cam 36 to move upwardly from the position shown in FIG. 3 to the position shown in FIG. 4. As an incident thereto, the rear cam surface 51 of the cam 36 acts against the rear cam surface 50 of the cam 35 to shift the latter cam linearly and rearwardly and thereby shift the rod 38 rearwardly to tilt the headlamp assembly 21 downwardly about the pivot 22. Rotation of the screw 42 in the opposite direction forces the cam 36 downwardly to cause its forward cam surface 51 to act against the forward cam surface 50 of the cam 35. As a result, that cam 35 and the rod 38 are shifted forwardly, and the headlamp assembly is tilted upwardly about the pivot 22.

As shown in FIG. 4, the extreme upper end portion 55 of the forward side of the cam 36 and the extreme lower end portion 56 of the rear side of the cam 36 are not inclined but instead extend parallel to the front and rear sides 27 and 28 of the housing 25. As the cam 36 moves upwardly and downwardly, the vertical upper and lower end portions 55 and 56 engage the front and rear sides 27 and 28, respectively, to help support the cam.

FIG. 6 shows the adjusting mechanism 20 of FIGS. 1 to 5 positioned to effect side-to-side adjustment of a headlamp assembly 21a. To this end, the adjusting mechanism is connected to one lateral side of the headlamp assembly and is operable to swing the assembly about a vertically extending pivot 60.

A modified form of housing 25A is shown in FIG. 7 and is somewhat less expensive to mold than the housing 25 of the embodiment of FIGS. 1 to 6. The housing 25A is formed by two identical front and rear halves which may be bonded together after the internal components have been assembled.

Another embodiment of an adjusting mechanism 20' incorporating the features of the invention is shown in FIGS. 8 to 11 in which parts corresponding to those of the first embodiment are indicated by the same but primed reference numerals. In this instance, the cam 35' is a solid block whose forward end portion is formed with an integral tongue 80 which projects forwardly through an opening 81 in the front wall of the housing 25', the tongue being connected to the rod 38'. The cam surfaces of the cam 35' are defined by upwardly and forwardly inclined grooves or channels 82 formed in the laterally facing sides of the cam. The screw 42' extends through a slot 83 (FIG. 11) formed through the cam 35' and elongated in the front-to-rear direction so as to accommodate back and forth movement of the cam.

Figure 9:
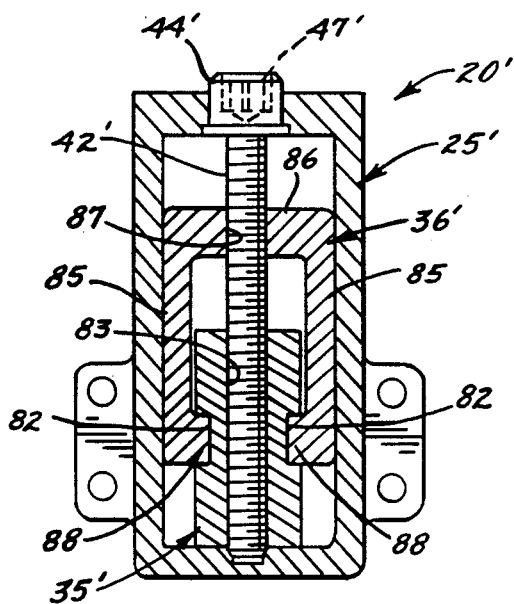
FIGS. 9 and 10 are cross-sections taken substantially along the lines 9—9 and 10—10, respectively, of FIG. 8.
Figure 10:
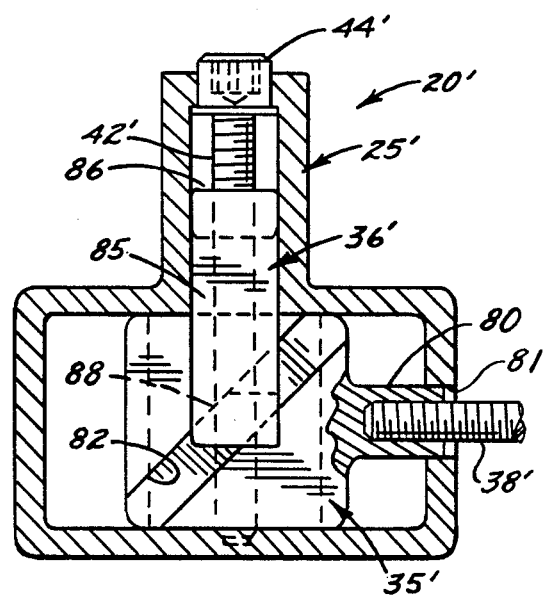
Figure 11:
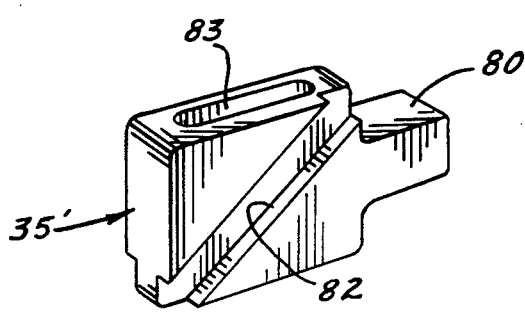
FIG. 11 is a perspective view of one of the cams of the adjusting mechanism shown in FIGS. 8 to 10.

The cam 36' includes a pair of laterally spaced arms 85 which straddle the cam 35' and whose upper ends are connected by an integral bridge 86 (FIG. 9). A threaded hole 87 is formed through the bridge and receives the adjusting screw 42' with an interference fit.

Formed integrally with the lower ends of the arms 85 are cam surfaces in the form of projections or lugs 88 (FIG. 9) which extend into the channels 82. When the cam 36' is shifted upwardly and downwardly by the screw 42', the lugs 88 ride along the channels 82 to shift the cam 35' and the rod 38' rearwardly and forwardly.

From the foregoing, it will be apparent that the present invention brings to the art a new and improved headlamp adjusting mechanism 20, 20' which utilizes relatively simple and relatively few parts and which thus may be manufactured at comparatively low cost. Because the cams 35, 35' and 36, 36' move linearly, only low stresses are imposed on the housing 25, 25' and thus the housing is not subjected to a high degree of flexure. Accordingly, the adjustment may be made in a trouble-free manner and, in addition, the seams and/or parting line of the housing remain sealed to prevent moisture and road grime from fouling the internal mechanism.

I claim:

1. The combination of, a frame, a vehicle headlamp, and mechanism for adjusting said headlamp relative to said frame, said mechanism comprising a housing secured to said frame, a link extending from said housing and connected to said headlamp, said link being movable linearly relative to said frame and being operable when moved to adjust said headlamp with respect to said frame, and selectively operable means for moving said link linearly in opposite directions, said means comprising a first cam connected to said link and supported in said housing to move linearly along a first path, a second cam supported in said housing to move linearly along a second path extending substantially perpendicular to said first path, an adjusting screw rotatably supported by said housing in a fixed axial position and threadably connected to said second cam, said screw being operable when rotated in opposite directions to move said second cam in opposite directions along said second path, and coacting cam surfaces on said cams and engageable with one another to cause said first cam to move in opposite directions along said first path when said second cam is moved in opposite directions along said second path.

2. A mechanism for adjusting a vehicle headlamp relative to a frame, said mechanism comprising a housing adapted to be secured to said frame, a link adapted to be connected to said headlamp, said link being movable linearly in first and second opposite directions relative to said housing and being operable when moved to adjust said headlamp with respect to said frame, and selectively operable means for moving said link in either of said directions, said means comprising a first cam connected to said link and supported in said housing to move linearly along a path in said first and second directions, a second cam supported in said housing to move linearly in third and fourth opposite directions along a path extending substantially perpendicular to the path of said first cam, an adjusting screw rotatably supported by said housing in a fixed axial position and threadably connected to said second cam, said screw being operable when rotated clockwise to move said second cam in said third direction and being operable when rotated counterclockwise to move said second cam in said fourth direction, and coacting cam surfaces on said cams and engageable with one another to cause said first cam to move in said first direction when said second cam is moved in said third direction and to cause said first cam to move in said second direction when said second cam is moved in said fourth direction.

3. A mechanism as defined in claim 2 in which one of said cams comprises a block having an opening formed therethrough, the other of said cams comprising a block disposed in said opening, said cam surfaces being defined by two opposing sides of said opening and by two opposing sides of the block of said other cam, said sides being inclined relative to the path of movement of said first cam.

4. A mechanism as defined in claim 3 in which said opening is formed through said first cam.

5. A mechanism as defined in claim 3 in which said housing is hollow and includes two opposing side walls, and openings formed through said side walls and slidably receiving said first cam to support said first cam for movement in said first and second directions.

6. A mechanism as defined in claim 2 in which said first cam comprises a block, the cam surfaces of said first cam comprising grooves formed in opposing sides of said block and inclined relative to the path of movement of said first cam, said second cam comprising a pair of arms having first and second ends and straddling said block, and the cam surfaces on said second cam comprising projections on the first ends of said arms and located slidably in said grooves.

7. A mechanism as defined in claim 6 further including a bridge interconnecting the second ends of said arms, a slot formed through said bridge and elongated in said first and second directions, said adjusting screw extending through said slot.

8. A mechanism as defined in claim 2 further including means adjustably connecting said link to said first cam for selective linear movement of said link in said first and second directions independently of the linear movement of said first cam.

9. A mechanism as defined in claim 2 in which said cam surfaces are flat and planar, the cam surfaces of said first cam being disposed in face-to-face engagement with the cam surfaces of said second cam.

10. A mechanism as defined in claim 2 in which said first cam comprises a block, the cam surfaces of said first cam comprising a groove formed in at least one side of said block and inclined relative to the path of movement of said first cam, the cam surfaces on said second cam comprising a projection located slidably in said groove.

* * * * *